United States Patent Office 3,819,664
Patented June 25, 1974

3,819,664
POLYCYCLIC DYES
Malcolm B. Burleigh, St. Paul, Minn., assignor to Minnesota Mining and Manufacturing Company, St. Paul, Minn.
No Drawing. Filed Sept. 13, 1971, Ser. No. 180,173
Int. Cl. C09b 3/22
U.S. Cl. 260—356        6 Claims

ABSTRACT OF THE DISCLOSURE

Novel polycyclic aromatic dye compounds are provided comprising at least two moieties in conjugate relationship as part of a single chromophore, each moiety comprising three linearly kata condensed six-membered aromatic rings with solubilizing groups attached to each moiety. At least one auxochromic group comprising an atom having an atomic weight of at least 31 is bonded to the chromophore portion of the compound by means of said atom.

---

This invention relates to novel polycyclic aromatic dyes.

The present invention provides a new class of dyes which are stable, very soluble in common organic solvents and possess high tinctorial strength. These dyes, in addition to being useful as conventional dyes, are useful as sensitizers. Some of these novel dyes have unexpected and particular utility as oxygen sensitizers. Thus, these novel dyes are particularly useful in certain copying and imaging processes wherein the image-forming reactant is destroyed or produced by excited oxygen. These dyes also have utility generally as spectral sensitizers; for example, for spectrally sensitizing the decomposition of certain organic halogen compounds to form acids or free radicals useful in promoting or catalyzing reactions, e.g., in an imaging process. These dyes are also useful as organic photoconductors. The dyes adsorb light in the visible range, i.e., generally in the range of 400 mu to 600 mu.

In accordance with the present invention there are provided polycyclic aromatic compounds comprising at least two moieties in conjugate relationship as part of a single chromophore, each said moiety comprising three linearly kata condensed six-membered aromatic rings, an —OR group being attached to the meso position of each said moiety, wherein R is a stable, monovalent organic radical; said —OR group being a solubilizing group for said compound; wherein at least one auxochromic group comprising an atom having an atomic weight of at least 31 is bonded to said chromophore, said atom being attached directly to said chromophore. The above-mentioned moieties comprising three linearly kata condensed six-membered aromatic rings may be described pictorially as follows:

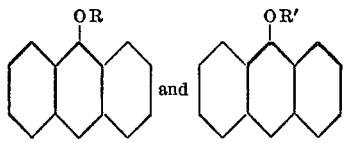

The aromatic rings may be homocyclic (carbon atoms) or heterocyclic, the hetero atoms being generally nitrogen. Of course, a single compound can contain both homocyclic and heterocyclic moieties of the type just described, or the compound may contain only homocyclic or only heterocyclic moieties.

These moieties are in conjugate relationship in the compound. Thus, the moieties may be bonded together in peri fashion such that the two moieties share atoms; or the moieties may be attached to each other in conjugate relationship through at least one linking moiety, where the linking moiety is selected from the group consisting of (a) atoms which are at least trivalent and are capable of forming covalent bonds, (b) ligands, having two or more atoms, which are at least bidentate, and (c) covalent single or double bonds.

Additionally, the compounds of the invention have at least one auxochromic group bonded to the chromophore thereof, the auxochromic group comprising an atom having an atomic weight of at least 31. The preferred auxochromic groups or radicals consist only of a single heavy atom.

Although the series of U.S. Pats. 2,183,625–2,183,630 (issued to Stallman) describe a class of substituted violanthrenes and isoviolanthrenes derived from vat dyes, such substitution related merely to pendent —OR groups. Such patents do not describe the novel dye compounds of my invention as described hereinbefore and as more particularly described hereinafter.

The dye compounds of this invention are characterized as having auxochromic groups comprising a heavy atom bonded directly to the chromophore of the compound. These heavy atom auxochromic groups are particularly important in increasing the effectiveness or efficiency of spectral sensitization of oxygen with these dyes.

Although the —OR and —OR' groups which are present on the novel dye compounds are also auxochromic groups, it has been found that the —OR and —OR' groups are primarily solubilizing groups for the compound, i.e., they primarily determine the solubility of the dye compound in various solvent media. It has also been found that the R and R' radicals have very little effect on the ability of the compound to function as a sensitizer. Thus, the chemical structure and nature of the R and R' radicals are not critical for purposes of the present invention.

Generally, it may be said that R and R' are monovalent radicals which are stable under ambient conditions and which do not cause decomposition of the chromophore portion of the dye compound. That is, these radicals do not oxidize or reduce the chromophore portion of the dye compound nor do they destroy or adversely affect the effectiveness of the compound as a dye. Within these limitations, R and R' are organic radicals which may be alkyl, cycloalkyl, substituted alkyl and cyoloalkyl, alkenyl, alkynyl, aryl, polycyclic, acyl, alkaryl or aralkyl. R and R' may be the same or different. Alkyl radicals having one carbon or more are common R radicals, and lower alkyl radicals are preferred, although long chain alkyls are also useful. Substituted alkyl radicals are herein defined to include alkyl radicals which are substituted with any moiety other than hydrogen atoms and other alkyl radicals.

The moieties comprising the three kata condensed six-membered aromatic rings are in a conjugate relationship in the dye compounds so that these moieties are part of a single chromophore (i.e. part of the same chromophore). A chromophore may be defined as a group of atoms or electrons in a molecule which is chiefly responsible for an absorption band, as defined in *Theory and Application of Ultraviolet Spectroscopy*; Jaffe and Orchin; John Wiley & Sons, Inc. (1962), incorporated herein by reference. The two moieties may be bonded or condensed together in peri fashion, e.g.

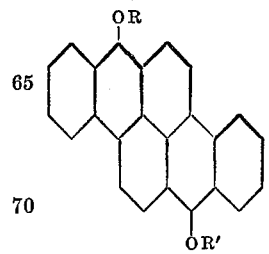 or 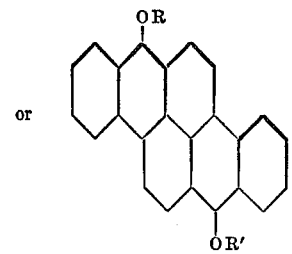

where the two moieties share atoms, or the moieties may be attached to each other in conjugate relationship through at least one linking moiety. The linking moieties are selected from the group consisting of (a) atoms which are at least trivalent and which are capable of forming covalent bonds, (b) ligands, having two or more atoms, which are at least bidentate (e.g. such ligands can be bidentate, tridentate, quadradentate, hexadentate, octadentate, etc.,), and (c) covalent single or double bonds.

The size, chemical nature or structure of the linking moiety is not critical insofar as the general ability of the dye compound to function as a sensitizer is concerned, so long as the two moieties comprising the kata condensed aromatic rings are attached to each other in conjugate relationship such that they are part of a single chromophore.

The linking moiety, of course, can be a polycyclic structure (homocyclic or heterocyclic). Hetero atoms in the heterocyclic linking moieties are generally nitrogen, oxygen and sulfur.

In many of the compounds there are two linking moieties. For example, there may be two ligands, one ligand and a covalent bond, two covalent bonds, etc., as linking moieties in a single compound.

The auxochromic groups which are bonded to the chromophore portion of the dye compound may consist of one atom or of many atoms, so long as a heavy atom (i.e. having an atomic weight of at least 31), present as part of the auxochromic group, is bonded directly to the chrmophore portion of the dye. An auxochromic group may be defined as a group bonded to a chromophore which influences the nature of the excited states of the chromophore and which does not create new excited states, as defined in *Theory and Application of Ultraviolet Spectroscopy*.

Preferred single atom auxochromic groups include chlorine, bromine, mercury, sulfur, iodine and selenium. Other useful single atom auxochromic groups include phosphorus (treated herein as having an atomic weight of 31), arsenic, tellurium, germanium, tin, lead and antimony. The auxochromic group may consist of more than one atom so long as a heavy atom present as part of the auxochromic group is directly bonded to the chromophore portion of the dye. For example,

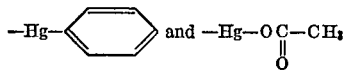

are useful auxochromic groups.

The above described auxocromic groups may be bonded directly to one or both of the moieties comprising the kata condensed aromatic rings, or the auxochromic groups may be bonded to the linking moiety instead, so long as the auxochromic groups are bonded to the chromophore portion of the compound. So far as is known, the particular positions of attachment of the auxochromic groups to the chromophore do not influence the ability of the dye compound to function as a sensitizer.

Preferred classes of dye compounds which have been found especially useful as oxygen sensitizers are as follows, where X represents an auxochromic group comprising a heavy atom bonded to the chromophore portion of the compound by means of said atom, and $n$ is one or more.

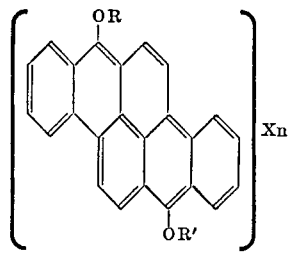

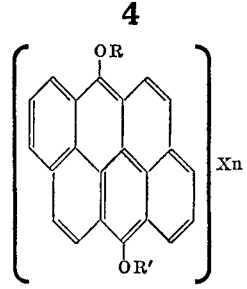

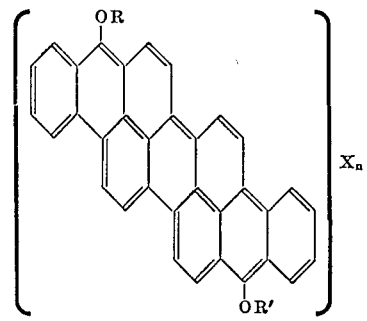

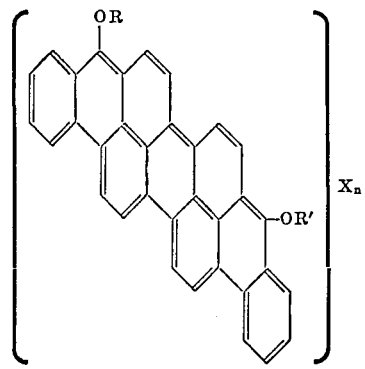

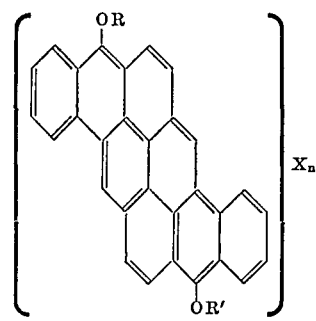

In addition to the —OR and —OR' solubilizing groups and the auxochromic groups (designated as X groups), the above classes of dye compounds may also be substituted with various other groups (e.g. fluorine, nitrile, hydroxy, alkyl, aryl, polycyclic, acyl, alkoxy) which are stable and do not cause decomposition of the chromophore portion of the dye compound.

With respect to the preferred classes of dye compounds described above, X preferably represents a heavy halogen atom (e.g. Cl or Br), and preferably $n$ is an integer of at least two. The X groups can be attached either to the linking moieties or to the moieties comprising the kata condensed aromatic rings.

The dye compounds of the invention can be prepared by independent synthesis but they are more conveniently prepared from precursor vat dyes containing the anthraquinoid moiety, i.e.

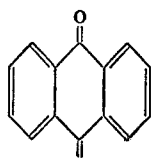

by first reducing the vat dye in the presence of a strong base. For example, Vat Violet 1 (Color Index No. 60010) may be reduced according to the following scheme to produce the dianion.

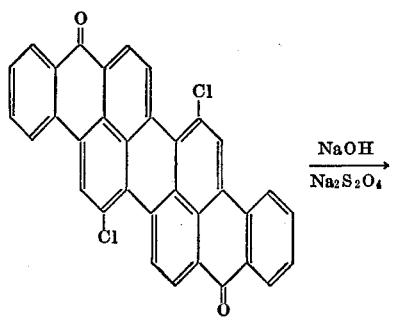

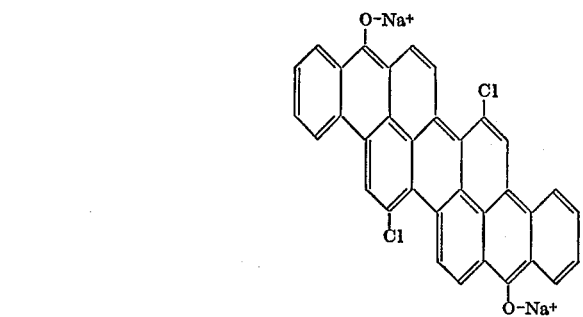

The dianion can then be alkylated with conventional alkylating agents, e.g.

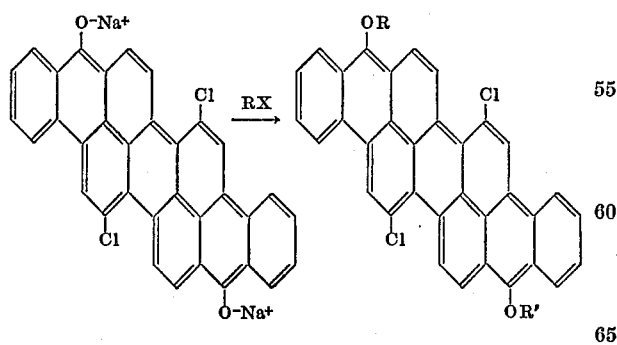

where RX represents agents such as alkyl iodide, alkyl toluene sulfonate or dialkyl sulfate.

To obtain compounds having R groups which are allyl, substituted allyl, propargyl, or substituted propargyl, alkylating agents such as allyl bromide and propargyl bromide may be used in the above reaction scheme.

To obtain compounds wherein R and R' represent cycloalkyl radicals the dianion may be reacted with activated cycloalkyl halides, such as 2-chlorohexanone, using the above reaction scheme. The resulting product has the following general formula:

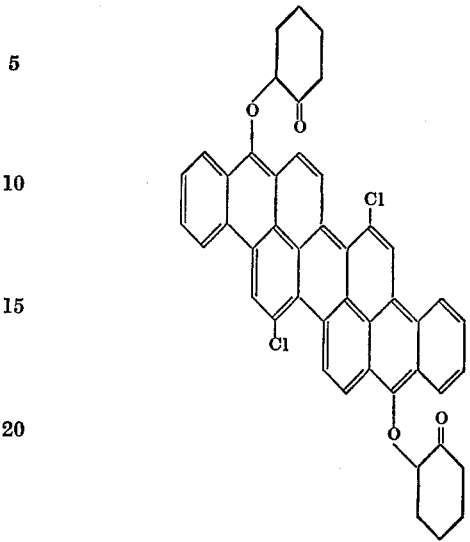

This product may be subsequently reduced via a Wolff-Kischner type reaction to a yield a compound of the following formula:

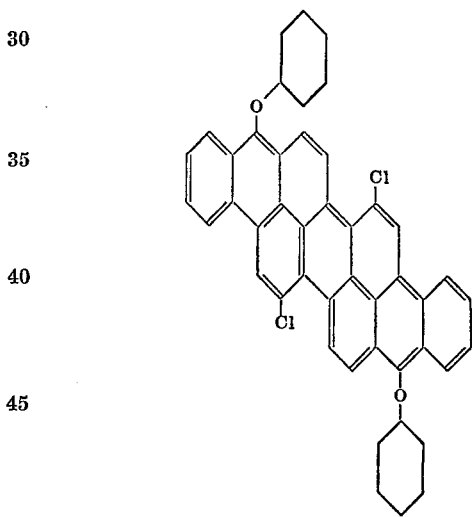

To form an acyl derivative the vat dye is first reduced in the presence of zinc metal and an acid (e.g. acetic acid) followed by reaction of the reduced compound with an anhydride (e.g. acetic anhydride). With Vat Violet 1 as the starting compound one obtains the following dye:

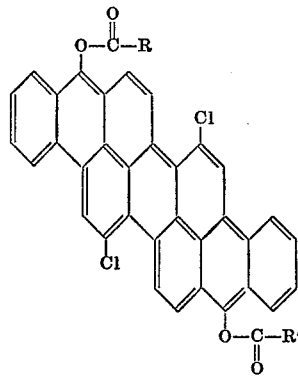

where R and R' represent stable monovalent organic radicals as described earlier herein.

An example of a reaction scheme which may be used to obtain dyes wherein R and R' represent substituted alkyl radicals is as follows. The vat dye is first reduced and acidified to obtain the —OH derivative of the vat dye. Then the following reaction is used,

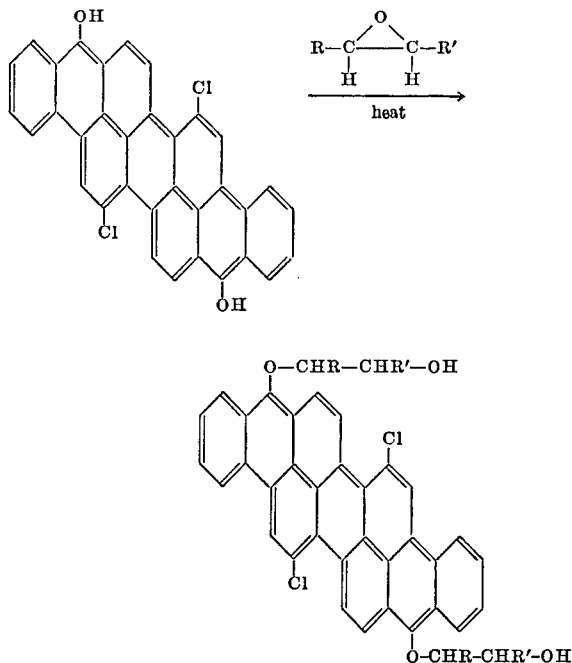

according to the description in U.S. Pat. 2,183,626.

An example of a reaction scheme which may be used to obtain dyes wherein R and R' represent substituted phenyl radicals is as follows. Vat Violet 1 is first reduced in tetrahydrofuran using potassium to obtain the dipotassium derivative as shown

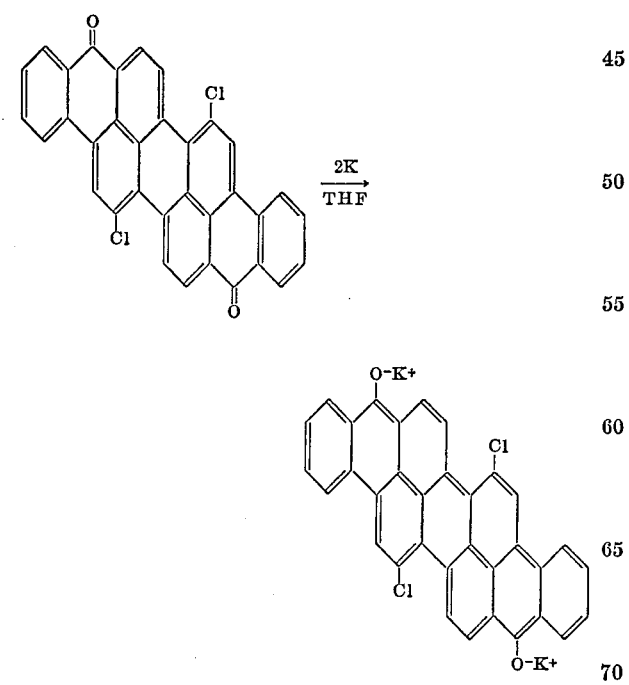

The tetrahydrofuran is removed by distillation and the material is allowed to react with iodobenzene and activated copper at an elevated temperature.

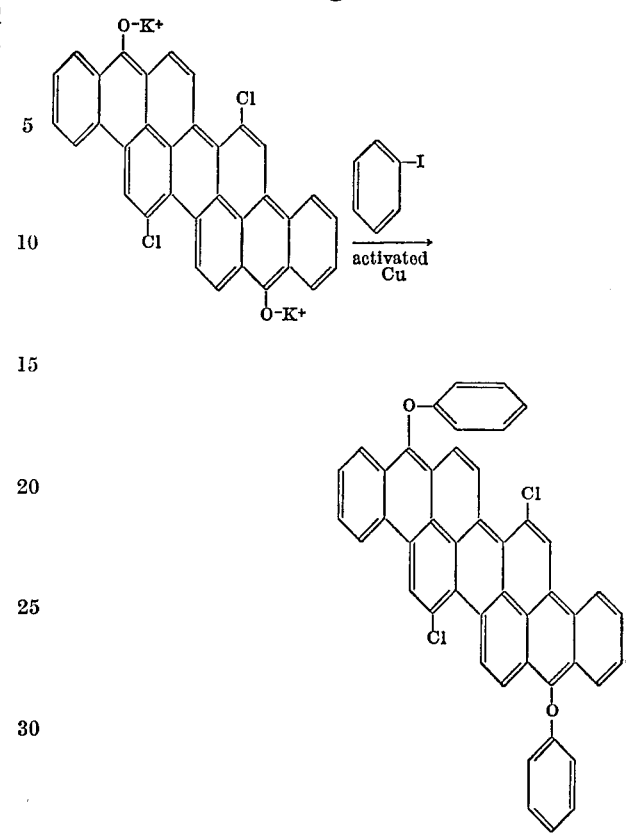

The resulting product is the diphenoxy derivative of Vat Violet 1.

The above reaction scheme is also useful for obtaining dye compounds wherein R and R' represent polycyclic radicals. For example, when 1-iodonaphthalene is reacted with the dipotassium derivative, a dye is obtained having the following formula:

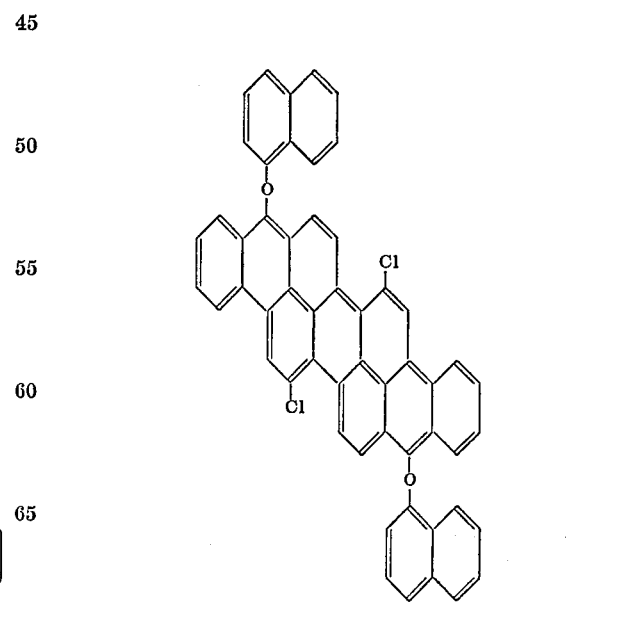

The auxochromic groups are generally put onto the chromophore portion of the vat dye before reduction and substitution of the vat dye, but this is not a necessary condition. To position chlorine atom auxochromic groups on a vat dye starting compound the following reaction is quite useful.

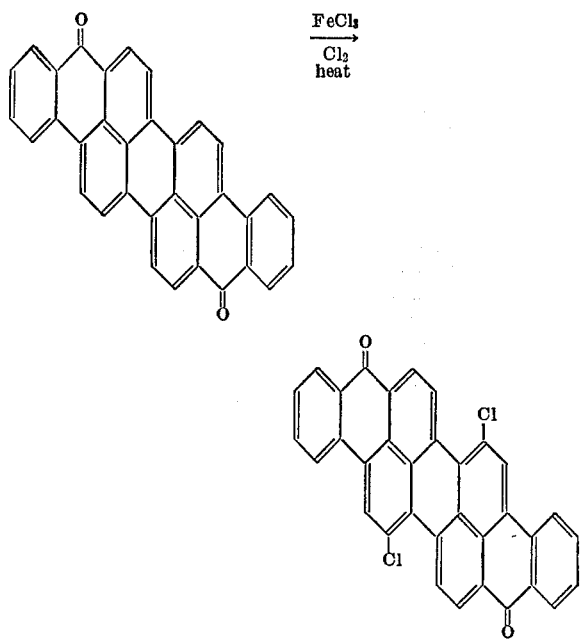

Other dye compounds within the scope of this invention can also be prepared according to the above reaction schemes. Exemplary halogenated vat dyes which are quite useful as starting materials for the preferred classes of dye compounds of this invention include Vat Blue 18 (Color Index 59815), Vat Blue 22 (Color Index 59820), Vat Orange 1 (Color Index 59105), Vat Orange 2 (Color Index 59705), Vat Orange 3 (Color Index 59300) and Vat Violet 1 (Color Index 60010).

EXAMPLE 1

A polycyclic aromatic dye compound of the invention is prepared using as a starting material Vat Blue 18 (Color Index 59815).

Into a 6 liter Erlenmeyer Pyrex reaction flask fitted with stirrer and nitrogen purge are added the following ingredients, with stirring, in the order and amounts shown, in a well ventilated hood:

Isopropanol: 1500 ml.
Powdered Vat Blue 18: 50 grams
Alkaline hydrosulfite solution (200 grams NaOH and 100 grams $Na_2S_2O_4$ dissolved in 1500 ml. distilled water).

Stirring is continued for 30 minutes at ambient temperature. Then 200 grams of diethyl sulfate are added and stirring is continued for two hours at ambient temperature; after which another 200 grams of diethyl sulfate are added and stirring is continued for another two hours whereby the product dye is formed. Then 2000 ml. of distilled water (heated to 70° C.) is added to the reaction flask with stirring, followed by the addition of 200 ml. of concentrated ammonium hydroxide. Stirring is continued for another 30 minutes.

The reaction mixture is then filtered through a coarse grade Whatman filter in a 38 cm. Büchner funnel with aspirator suction. The product dye cake is then washed with distilled water. The product dye cake is not allowed to become dry or cracked at any time. The product dye cake is then washed with ethanol in the funnel until the color of the ethanol wash becomes pinkish. The product dye is then collected and dried with a yield of approximately 80%.

The product dye is of the formula

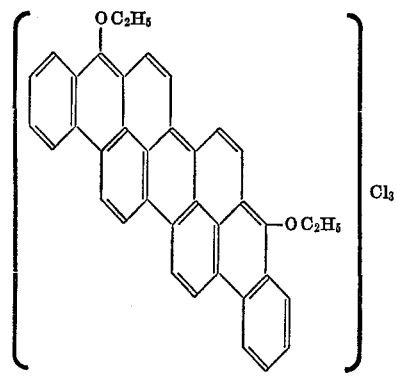

EXAMPLE 2

A polycyclic dye compound is prepared using as a starting vat dye material 50 grams of Vat Orange 2 (Color Index 59705) according to the procedure of Example 1. The product dye cake is washed with water and ethanol according to procedure of Example 1 until the ethanol wash becomes yellow in color. The product dye has the formula

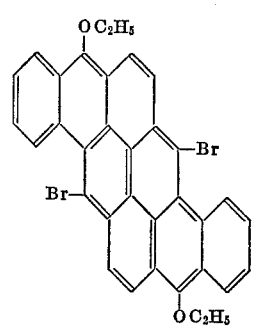

EXAMPLE 3

A polycyclic dye compound is prepared according to the procedure of Example 1 using as a starting material 50 grams of Vat Violet 1 (Color Index 60010). The product dye cake is washed with water and ethanol according to the procedure of Example 1 until the ethanol wash becomes pinkish in color. The product dye has the formula

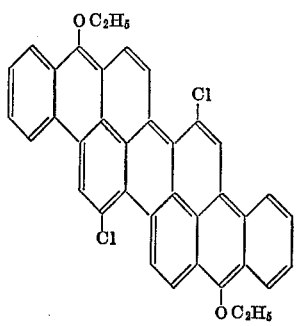

EXAMPLE 4

A polycyclic dye compound is prepared according to the procedure of Example 1 using as a starting material 50 grams of Vat Orange 3 (Color Index 59300). The product dye cake is washed with water and ethanol according to the procedure of Example 1 until the ethanol wash becomes yellow in color. The product dye is of the formula

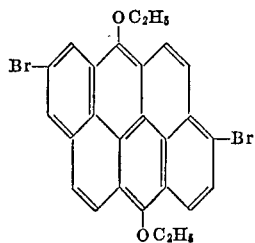

EXAMPLE 5

A polycyclic dye compound is prepared according to the procedure of Example 1 using as a starting material 50 grams of Vat Orange 1 (Color Index 59105). The product dye cake is washed with water and ethanol according to the procedure of Example 1 until the ethanol wash becomes yellow in color. The product dye is of the formula

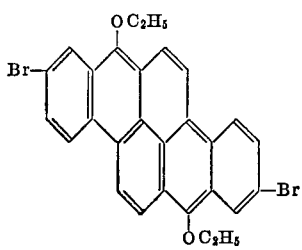

EXAMPLE 6

The ability of a preferred class of dye compounds to desensitize an acceptor, in the presence of oxygen, is shown in the following example.

One hundredth mole (0.01 mole) of 1,3-diphenylisobenzofuran was dissolved in one liter of acetone into which 0.125 grams of a sensitizer dye of the formula

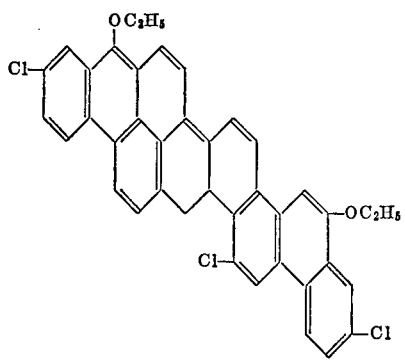

had been dissolved. Light from two 150 watt flood lamps, focused by two round bottom flasks filled with water, was used to photolyze the solution. Air, scrubbed with acetone, was bubbled in to provide the solution with oxygen. The entire solution was rapidly stirred with a magnetic stirrer. The total photolyzing time was 6000 seconds during which the 1,3-diphenylisobenzofuran was seen to disappear linearly and smoothly with a zero order rate plot. The concentration of acceptor as well as sensitizer dye was followed by U.V.-visible spectroscopy. The concentration of the dye did not change throughout the course of the reaction.

When the light was turned off the concentration of acceptor no longer decreased. When the solution was photolyzed in the absence of oxygen the concentration of the 1,3-diphenylisobenzofuran no longer decreased. When the solution was photolyzed without the presence of sensitizer dye but in the presence of oxygen the rate of acceptor disappearance was extremely slow.

The above experiment indicates that the sensitizer dye, oxygen and light are all necessary elements for the destruction of acceptor under these conditions.

Similar results are obtained with the use of the other preferred classes of dye compounds of the invention.

When the sensitizer dye and the 1,3-diphenylisobenzofuran are coated onto a film backing with a film forming binder and are subsequently exposed to visible light from a tungsten lamp similar disappearance of the acceptor is observed.

The following non-limiting examples further illustrate the use of the dyes of the present invention, wherein the term "parts" refers to parts by weight unless otherwise indicated.

EXAMPLE 7

An intermediate film member imaging sheet is provided by coating a thin (1 mil) transparent "Mylar" polyester film with a coating solution of film-forming binder, acceptor, and sensitizing dye. The coating solution is prepared by dissolving 0.02 parts of a sensitizing dye of the formula

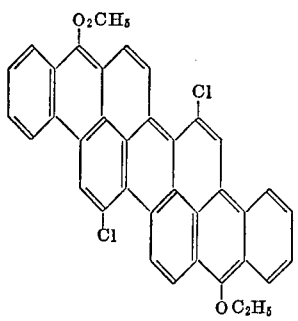

into 2.0 parts of chloroform which is then added to a solution of 8 parts n-butanol in 87 parts acetone. Five parts of ethoxylated cellulose (Ethocel N–100) is then dissolved into the solution containing the dye, after which 0.2 part of 4-methoxy-1-naphthol is added. The resulting solution is coated (1 mil orifice) onto the polyester film in darkness and is allowed to dry at room temperature for 15 minutes. A pink light-transmissive sensitized intermediate film member results.

The intermediate film member is first placed with its coated surface in contact with a multi-colored original having light-absorptive inked image areas on a reflective white paper background and which is then uniformly exposed through the film to intense illumination from a bank of tungsten filament lamps for a time just sufficient to desensitize the coating completely at the background areas. A typical exposure time may be 12–15 seconds.

The exposed intermediate film member is then placed with its coated surface in contact with the coated surface of a receptor or image sheet prepared in accordance with U.S. Pat. 3,218,166 (Example 1) and the composite is heated, for example, between rolls or platens, for 4–5 seconds at 125–140° C. A copy of the graphic original is produced on the coated sheet. The image areas are a dense black, while the background areas remain visibly unchanged.

What is claimed is:

1. A compound of the formula

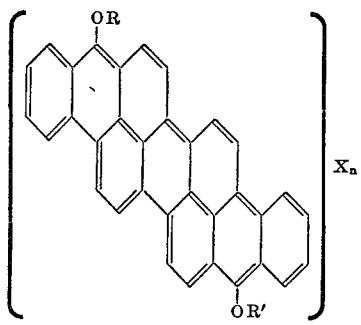

where R and R' are stable, monovalent organic radicals selected from the group consisting of lower alkyl, allyl, propargyl, cyclohexyl, phenyl, acetyl and naphthyl, and where X is an auxochromic group bonded to the chromophore of said compound and is selected from the group consisting of chlorine, bromine and iodine atoms, wherein $n$ is 1–3.

2. A compound in accordance with claim 1 wherein X is chlorine or bromine.

3. A compound in accordance with claim 1 wherein R and R' are lower alkyl radicals.

4. A compound of the formula

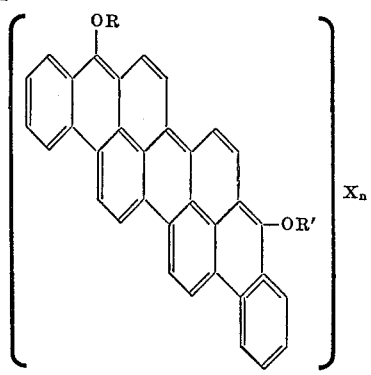

where R and R' are stable monovalent organic radicals selected from the group consisting of lower alkyl, allyl, propargyl, cyclohexyl, phenyl, acetyl and naphthyl, and where X is at least one auxochromic group bonded to the chromophore of said compound and is selected from the group consisting of chlorine, bromine and iodine atoms wherein $n$ is 1–3.

5. A compound in accordance with claim 4 wherein X is chlorine or bromine.

6. A compound of the formula

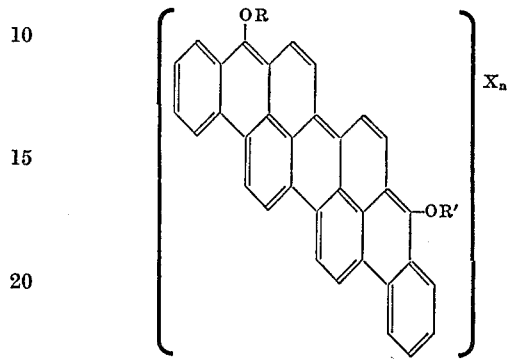

where R and R' are the same and are lower alkyl radicals, and where X is bonded to the chromophore of said compound and is selected from the group consisting of chlorine, bromine and iodine, and wherein $n$ is 2 or 3.

References Cited

UNITED STATES PATENTS

| | | | |
|---|---|---|---|
| 1,926,050 | 12/1933 | Kunz et al. | 260—356 |
| 1,953,415 | 4/1934 | Kunz et al. | 260—356 |
| 2,148,042 | 2/1939 | Stallman et al. | 260—355 |
| 2,183,626 | 12/1939 | Stallman | 260—355 |
| 2,183,628 | 12/1939 | Stallman | 260—355 |

FOREIGN PATENTS

| | | | |
|---|---|---|---|
| 263,826 | 5/1928 | Great Britain | 260—356 |

LORRAINE A. WEINBERGER, Primary Examiner

E. J. SKELLY, Assistant Examiner

U.S. Cl. X.R.

96—1.5, 48 R, 89; 260—353, 359, 360, 362

UNITED STATES PATENT AND TRADEMARK OFFICE
CERTIFICATE OF CORRECTION

PATENT NO. : 3,819,664
DATED : June 25, 1974
INVENTOR(S) : Malcolm B. Burleigh

It is certified that error appears in the above-identified patent and that said Letters Patent are hereby corrected as shown below:

Column 2, lines 61-75 structures ,

" 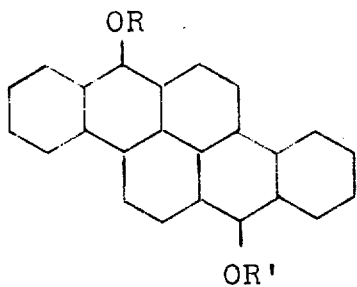 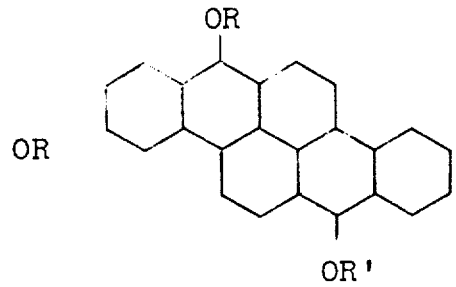 "

should read

-- 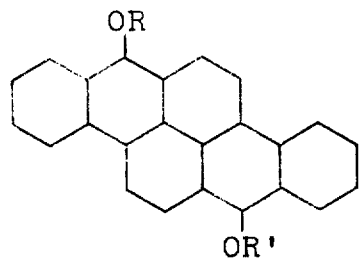 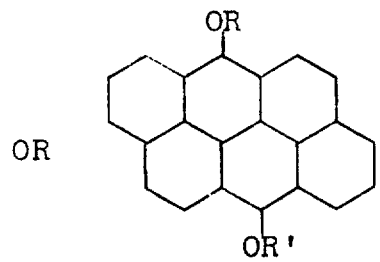 --

Column 12, line 30    "$O_2CH_5$"
should read -- $OC_2H_5$ --.

Column 3, line 29
"chrmophore" should read -- chromophore --.

Signed and Sealed this

Twentieth Day of July 1976

[SEAL]

Attest:

RUTH C. MASON
Attesting Officer

C. MARSHALL DANN
Commissioner of Patents and Trademarks